(12) United States Patent　　(10) Patent No.:　US 12,667,799 B2
Okuno　　(45) Date of Patent:　Jun. 30, 2026

(54) IN-LINE STRAINER

(71) Applicant: Three-M Industry Co., Ltd., Osaka (JP)

(72) Inventor: Hideo Okuno, Osaka (JP)

(73) Assignee: Three-M Industry Co., Ltd., Osaka (JP)

( * ) Notice: Subject to any disclaimer, the term of this patent is extended or adjusted under 35 U.S.C. 154(b) by 0 days.

(21) Appl. No.: 18/691,344

(22) PCT Filed: May 24, 2023

(86) PCT No.: PCT/JP2023/019396
　　§ 371 (c)(1),
　　(2) Date: Mar. 12, 2024

(87) PCT Pub. No.: WO2024/014139
　　PCT Pub. Date: Jan. 18, 2024

(65) Prior Publication Data
　　US 2024/0399275 A1　　Dec. 5, 2024

(30) Foreign Application Priority Data

Jul. 15, 2022　(JP) ................................. 2022-113745

(51) Int. Cl.
　　*B01D 35/02*　　　(2006.01)
　　*B01D 29/11*　　　(2006.01)
(52) U.S. Cl.
　　CPC .......... *B01D 35/023* (2013.01); *B01D 29/114* (2013.01)
(58) Field of Classification Search
　　None
　　See application file for complete search history.

(56) References Cited

U.S. PATENT DOCUMENTS

| | | | | | |
|---|---|---|---|---|---|
| 5,404 | A | * | 12/1847 | Watson | ................ B01D 29/118 |
| | | | | | 210/415 |
| 322,722 | A | * | 7/1885 | Howes | ................ B01D 37/025 |
| | | | | | 417/442 |

(Continued)

FOREIGN PATENT DOCUMENTS

| | | |
|---|---|---|
| CN | 210097067 U | 2/2020 |
| JP | 59-139770 U | 9/1984 |

(Continued)

OTHER PUBLICATIONS

International Search Report (PCT/ISA/210) issued in PCT Application No. PCT/JP2023/019396 dated Aug. 8, 2023 with English translation (5 pages).

(Continued)

*Primary Examiner* — Robert J Popovics
(74) *Attorney, Agent, or Firm* — Crowell & Moring LLP

(57)　　　　　ABSTRACT

Provided is an in-line strainer capable of more reliably preventing the concentrated adhesion and accumulation of solid foreign matter or the like on a portion of a screen. In an in-line strainer according to the present invention, a housing 9 includes a cylinder wall 24 that is formed in a hollow cylindrical shape and extends in the vertical direction, and a top wall 25 that closes an upper end of the cylinder wall 24. The filter chamber 8 is divided into a primary flow path chamber 39 formed on the upper side and communicating with an inflow port 6 and a secondary flow path chamber 40 formed on the lower side and communicating with an outflow port 7, and a through-hole 38 is provided in an open manner between the two chambers 39 and 40. The screen 10 includes a filter cylinder 33 that is formed in a vertically long hollow cylindrical shape having openings at upper and lower ends, and a bottom lid 34 that closes the lower-end opening of the filter cylinder 33, and an introduction port 36 that allows introduction of liquid is (Continued)

formed at the upper end of the filter cylinder 33. The screen 10 is disposed in the filter chamber 8, in an orientation such that the introduction port 36 faces the through-hole 38, and the outflow port 7 is provided in an open manner in the cylinder wall 24 that faces the lower half of the filter cylinder 33.

11 Claims, 8 Drawing Sheets

(56) References Cited

U.S. PATENT DOCUMENTS

| | | | | | |
|---|---|---|---|---|---|
| 432,793 | A | * | 7/1890 | Crocker | B01D 35/02 210/312 |
| 441,667 | A | * | 12/1890 | Jewell | B01D 29/23 417/313 |
| 511,798 | A | * | 1/1894 | Rankine | B01D 35/147 210/418 |
| 555,020 | A | * | 2/1896 | Railton et al. | B01D 33/23 210/313 |
| 687,384 | A | * | 11/1901 | Osbourn | B01D 29/35 210/454 |
| 712,089 | A | * | 10/1902 | Piatt | F28F 19/01 237/67 |
| 738,088 | A | * | 9/1903 | Vauclain et al. | B01D 35/02 285/354 |
| 781,039 | A | * | 1/1905 | Weabe | B01D 29/05 210/414 |
| 788,922 | A | * | 5/1905 | Mackenzie | B01D 29/05 210/414 |
| 794,271 | A | * | 7/1905 | Anson | B01D 21/02 210/411 |
| 800,298 | A | * | 9/1905 | Heilrath | B01D 29/05 210/429 |
| 827,780 | A | * | 8/1906 | Benoit | B01D 29/23 210/317 |
| 842,602 | A | * | 1/1907 | Wurdack | B01D 29/48 210/402 |
| 894,035 | A | * | 7/1908 | Mueller | B01D 35/02 210/313 |
| 908,308 | A | * | 12/1908 | Mueller | B01D 29/23 210/453 |
| 989,975 | A | * | 4/1911 | Holt | B01D 35/02 210/415 |
| 999,532 | A | * | 8/1911 | Watters | B01D 35/043 210/429 |
| 1,046,679 | A | * | 12/1912 | Thoma | B01D 29/56 210/418 |
| 1,053,131 | A | * | 2/1913 | Overly | B01D 29/05 210/414 |
| 1,098,150 | A | * | 5/1914 | Hauer | B01D 33/073 210/330 |
| 1,102,791 | A | * | 7/1914 | Overly | B01D 35/02 210/314 |
| 1,130,725 | A | * | 3/1915 | Getts | B01D 33/067 55/296 |
| 1,140,459 | A | * | 5/1915 | Holt | B01D 17/00 210/429 |
| 1,161,715 | A | * | 11/1915 | Merrill | B01D 29/03 210/411 |
| 1,175,948 | A | * | 3/1916 | French | B01D 21/26 D23/209 |
| 1,199,350 | A | * | 9/1916 | Collin | B01D 29/05 210/414 |
| 1,274,940 | A | * | 8/1918 | Sage | B01D 29/23 210/452 |
| 1,340,599 | A | * | 5/1920 | Clarke | B01D 35/02 210/411 |
| 1,402,821 | A | * | 1/1922 | Wishart | B01D 35/005 55/296 |
| 1,438,983 | A | * | 12/1922 | Collin | B01D 27/00 137/625.5 |
| 1,439,706 | A | * | 12/1922 | Kneuper | B01D 37/02 210/93 |
| 1,483,892 | A | * | 2/1924 | Kinney | B01D 35/12 210/341 |
| 1,496,771 | A | * | 6/1924 | Cash | B01D 35/02 210/310 |
| 1,508,480 | A | * | 9/1924 | Skinner | B01D 35/02 210/451 |
| 1,510,863 | A | * | 10/1924 | Rose | B01D 29/6415 210/414 |
| 1,525,449 | A | * | 2/1925 | Johnson | B01D 29/66 210/414 |
| 1,534,129 | A | * | 4/1925 | Marden | B01D 35/02 210/318 |
| 1,547,955 | A | * | 7/1925 | Price | F22D 11/00 210/411 |
| 1,568,126 | A | * | 1/1926 | Bassett | B01D 29/23 210/238 |
| 1,590,128 | A | * | 6/1926 | Staples | B01D 29/35 210/454 |
| 1,595,983 | A | * | 8/1926 | Armstrong | B01D 35/02 210/313 |
| 1,616,577 | A | * | 2/1927 | Janette | B01D 35/005 210/248 |
| 1,617,048 | A | * | 2/1927 | Gregory | B01D 36/003 210/429 |
| 1,631,822 | A | * | 6/1927 | Jahn | B01D 35/02 210/312 |
| 1,632,699 | A | * | 6/1927 | Denney | B01D 35/02 210/443 |
| 1,634,463 | A | * | 7/1927 | Hills | B01D 29/904 210/315 |
| 1,639,208 | A | * | 8/1927 | Basenau | F24D 19/081 138/40 |
| 1,657,173 | A | * | 1/1928 | Morrison | B01D 35/153 210/135 |
| 1,671,487 | A | * | 5/1928 | Quiroz | B01D 29/682 210/194 |
| 1,673,391 | A | * | 6/1928 | Brubaker | B01D 35/02 210/453 |
| 1,679,033 | A | * | 7/1928 | Holmes | B01D 35/02 210/312 |
| 1,685,655 | A | * | 9/1928 | Wenzka | B01D 29/902 210/120 |
| 1,803,477 | A | * | 5/1931 | Kullander | B01D 29/6484 210/414 |
| 1,899,030 | A | * | 2/1933 | Gruman | B01D 35/153 417/313 |
| 1,903,774 | A | * | 4/1933 | Burrell | B01D 33/503 210/402 |
| 1,926,557 | A | * | 9/1933 | Perkins | B01D 29/6476 210/357 |
| 1,958,268 | A | * | 5/1934 | Goldman | B01D 29/15 210/508 |
| 1,961,498 | A | * | 6/1934 | Krueger | B01D 35/02 210/497.3 |
| 1,977,601 | A | * | 10/1934 | Winton | F16L 55/24 210/411 |
| 1,979,200 | A | * | 10/1934 | Hoare | B01D 25/38 210/357 |
| 1,987,142 | A | * | 1/1935 | Clements, Jr. | B01D 29/6484 210/414 |
| 1,993,214 | A | * | 3/1935 | Hass | B01D 29/82 210/489 |
| 2,065,263 | A | * | 12/1936 | Beldam | B01D 29/6476 210/497.1 |
| 2,125,532 | A | * | 8/1938 | Wells | B01D 29/118 210/414 |
| 2,184,243 | A | * | 12/1939 | Belyavin | B01D 29/44 96/392 |
| 2,202,191 | A | * | 5/1940 | Cuno | B01D 29/48 210/497.1 |
| 2,275,958 | A | * | 3/1942 | Hagel | B01D 35/16 210/414 |

(56) References Cited

U.S. PATENT DOCUMENTS

| | | | | |
|---|---|---|---|---|
| 2,305,351 A * | 12/1942 | Hellan | B01D 35/00 | 210/313 |
| 2,359,938 A * | 10/1944 | Quiroz | B01D 35/14 | 210/453 |
| 2,372,445 A * | 3/1945 | Morgan | B01D 35/02 | 210/453 |
| 2,399,994 A * | 5/1946 | Feagin | B01D 35/16 | 210/310 |
| 2,408,741 A * | 10/1946 | Dodge | B01D 29/356 | 210/355 |
| 2,412,043 A * | 12/1946 | Rawson | B01D 35/02 | 210/318 |
| 2,553,567 A * | 5/1951 | Fette | C12C 7/24 | 210/414 |
| 2,557,375 A * | 6/1951 | Dickenson | B01D 29/117 | 210/111 |
| 2,594,785 A * | 4/1952 | Meeker | B02C 18/0092 | 210/415 |
| 2,606,663 A * | 8/1952 | Blackman | F16L 55/24 | 210/451 |
| 2,652,153 A * | 9/1953 | Perrault | F16L 55/24 | 210/355 |
| 2,678,732 A * | 5/1954 | Banks | B01D 29/6476 | 210/414 |
| 3,011,644 A * | 12/1961 | Mankin | B01D 29/23 | 210/453 |
| 3,179,253 A * | 4/1965 | Mcneal | B01D 29/96 | 55/505 |
| 3,348,694 A * | 10/1967 | Smith | B01D 35/046 | 137/547 |
| 3,367,506 A * | 2/1968 | Rosaen | B01D 35/16 | 210/411 |
| 3,379,312 A * | 4/1968 | Brown | B01D 35/147 | 210/457 |
| 3,491,890 A * | 1/1970 | Patton | B01D 29/70 | 210/427 |
| 3,637,078 A * | 1/1972 | Hollar | B01D 27/08 | 210/456 |
| 3,748,837 A * | 7/1973 | Billeter | B61G 5/08 | 251/315.1 |
| 3,762,563 A * | 10/1973 | Petersen | B01D 29/6476 | 210/415 |
| 3,779,388 A * | 12/1973 | Coughlin | B01D 35/043 | 210/392 |
| 3,823,831 A * | 7/1974 | LeBlanc, Jr. | B01D 35/02 | 210/429 |
| 3,850,802 A * | 11/1974 | Berger | B01D 29/6423 | 210/447 |
| 3,959,140 A * | 5/1976 | Legras | B01D 29/94 | 210/489 |
| 3,997,441 A * | 12/1976 | Pamplin, Jr. | B01D 37/02 | 210/791 |
| 4,003,837 A * | 1/1977 | Osborne | B01D 29/6476 | 241/43 |
| 4,054,528 A * | 10/1977 | Treiber | B01D 29/86 | 210/415 |
| 4,081,171 A * | 3/1978 | Morgan | B01D 29/70 | 251/30.02 |
| 4,082,676 A * | 4/1978 | Dulger | B01D 35/043 | 210/451 |
| 4,217,220 A * | 8/1980 | Egli | B01D 29/118 | 210/791 |
| 4,402,829 A * | 9/1983 | Cordua | B01D 29/46 | 210/488 |
| 4,478,617 A * | 10/1984 | Rees | B60T 17/04 | 55/482 |
| 4,550,896 A * | 11/1985 | Hansen, III | F16K 27/029 | 251/366 |
| 4,582,605 A * | 4/1986 | Rea | B01D 29/35 | 210/450 |
| 4,585,553 A * | 4/1986 | Hikosaka | B03C 1/30 | 210/111 |
| 4,597,871 A * | 7/1986 | Okouchi | B01D 29/908 | 210/512.1 |
| 4,946,598 A * | 8/1990 | Murphy | B01D 35/02 | 210/453 |
| 5,087,365 A * | 2/1992 | Davis | B01D 29/6476 | 210/415 |
| 5,188,335 A * | 2/1993 | Pettinaroli | F16K 35/06 | 137/550 |
| 5,198,111 A * | 3/1993 | Davis | B01D 29/6484 | 210/414 |
| 5,332,499 A * | 7/1994 | Spencer | B01D 33/073 | 210/402 |
| 5,361,801 A * | 11/1994 | Kerpan | F16K 5/0605 | 210/449 |
| 5,467,796 A * | 11/1995 | Pettinaroli | F16K 27/067 | 137/238 |
| 5,527,462 A * | 6/1996 | Davis | B01D 29/6484 | 210/414 |
| 6,258,594 B1 * | 7/2001 | Nakaya | A47K 11/00 | 210/414 |
| 6,840,272 B2 * | 1/2005 | Hildreth, Jr. | B01D 53/261 | 137/556 |
| 7,297,265 B1 * | 11/2007 | Booth | B01D 29/688 | 210/411 |
| 8,480,897 B2 * | 7/2013 | Hwang | B01D 29/117 | 210/313 |
| 8,524,075 B1 * | 9/2013 | Quintel | B01D 29/688 | 210/791 |
| 8,727,248 B2 * | 5/2014 | Galanty | F04D 7/045 | 241/46.06 |
| 8,752,480 B1 * | 6/2014 | DeJong | A23L 2/04 | 99/506 |
| 9,187,890 B2 * | 11/2015 | Semba | B01D 29/445 | |
| 9,211,489 B2 * | 12/2015 | Riggers | B08B 5/04 | |
| 9,616,363 B2 * | 4/2017 | Osman Oguz | B01D 29/94 | |
| 10,245,531 B2 * | 4/2019 | Steiner | B01D 29/688 | |
| 10,286,338 B2 * | 5/2019 | Levitt | B01D 29/23 | |
| 10,646,801 B2 * | 5/2020 | Tameroglu | B01D 29/6415 | |
| 10,905,983 B1 | 2/2021 | Lincoln et al. | | |
| 11,083,985 B2 * | 8/2021 | Nellis | B01D 46/681 | |
| 11,278,826 B2 * | 3/2022 | Deutschmeyer | B01D 29/688 | |
| 11,376,532 B2 * | 7/2022 | Qiu | F16K 47/08 | |
| 11,648,592 B2 * | 5/2023 | Borghi | B01D 29/356 | 134/111 |
| 11,745,126 B2 * | 9/2023 | Ismert | B01D 35/30 | 210/238 |
| 11,872,507 B2 * | 1/2024 | Jellinggaard | B01D 29/682 | |
| 11,957,999 B2 * | 4/2024 | Johann | B01D 29/688 | |
| 11,969,675 B2 * | 4/2024 | Okuno | B01D 29/902 | |
| 12,208,348 B2 * | 1/2025 | Vestman | B01D 29/35 | |
| 12,274,962 B2 * | 4/2025 | Eisen | B01D 29/684 | |
| 12,359,763 B2 * | 7/2025 | Chung | F16L 55/24 | |
| 12,415,149 B2 * | 9/2025 | Mueller | B01D 29/35 | |
| 12,427,453 B2 * | 9/2025 | Vaidhyanathan | B01D 33/48 | |
| 12,427,455 B2 * | 9/2025 | Hamkens | B01D 35/02 | |
| 2010/0116732 A1 * | 5/2010 | Jung | B01D 35/02 | 210/447 |
| 2011/0220586 A1 * | 9/2011 | Levitt | B01D 29/6415 | 210/791 |
| 2013/0087495 A1 * | 4/2013 | Riggers | B01D 46/04 | 210/415 |
| 2013/0306546 A1 * | 11/2013 | Cartarius | B01D 29/117 | 210/411 |
| 2015/0196859 A1 * | 7/2015 | Levitt | B01D 29/902 | 210/435 |
| 2016/0214039 A1 * | 7/2016 | Tameroglu | B01D 29/6446 | |
| 2016/0368781 A1 * | 12/2016 | Mueller | B01D 1/0058 | |
| 2017/0014736 A1 * | 1/2017 | Osman Oguz | B01D 29/23 | |
| 2018/0207557 A1 * | 7/2018 | Nellis | B01D 29/6476 | |
| 2019/0201818 A1 * | 7/2019 | Johann | B01D 29/682 | |
| 2021/0023482 A1 * | 1/2021 | Eisen | B01D 29/684 | |
| 2022/0001310 A1 * | 1/2022 | Jellinggaard | B01D 29/682 | |
| 2022/0047973 A1 * | 2/2022 | Eisen | B01D 29/688 | |
| 2022/0184535 A1 * | 6/2022 | Okuno | B01D 35/02 | |
| 2022/0339562 A1 * | 10/2022 | Vestman | C02F 1/001 | |
| 2023/0182046 A1 * | 6/2023 | Gilboa | B01D 29/688 | 210/106 |

(56)          References Cited

U.S. PATENT DOCUMENTS

2023/0405500 A1 * 12/2023 Mueller ................. B01D 29/35
2024/0335773 A1 * 10/2024 Gilboa .............. B01D 29/6438
2024/0353047 A1 * 10/2024 Chung .................. B01D 35/02
2024/0399275 A1 * 12/2024 Okuno .................. B01D 29/11
2025/0269306 A1 *  8/2025 Linster .................. B01D 29/23

FOREIGN PATENT DOCUMENTS

JP          62-1714 U    1/1987
JP          3-75811 U    7/1991
JP     2014-178000 A    9/2014
JP     2020-185543 A   11/2020

OTHER PUBLICATIONS

Japanese-language Written Opinion (PCT/ISA/237) issued in PCT
Application No. PCT/JP2023/019396 dated Aug. 8, 2023 with
English translation (7 pages).
Japanese-language Office Action issued in Japanese Application No.
2022-113745 dated Jul. 25, 2023 with English translation (10
pages).

* cited by examiner

IN-LINE STRAINER

TECHNICAL FIELD

The present invention relates to an in-line strainer incorporated in a piping line through which liquid passes and filtering solid foreign matter or the like contained in the liquid.

BACKGROUND ART

The main purpose of the strainer according to the present invention is to prevent the concentrated adhesion and accumulation of solid foreign matter or the like (filter residues) on the portion of a filter cylinder which constitutes a screen in the vicinity of an outflow port, and a strainer having a similar purpose is disclosed in Patent Literature 1. In the strainer of Patent Literature 1, an inflow port through which liquid flows in and the outflow port through which liquid flows out are coaxially provided, and a housing (strainer body) having a filter chamber (accommodation chamber) between the inflow port and the outflow port is provided. The screen (strainer) installed inside the filter chamber includes a filter net formed in a cylindrical shape and a disk-shaped bottom plate disposed at the lower end of the filter net, and is formed in a bottomed cylindrical shape having an opening at the top. When mounted in the filter chamber, the upper half of the screen faces the outflow port. A spiral plate for fluid control is provided inside the screen, and the fluid flowing into the screen flows downward while being swirled along the spiral plate, so that filtration can be performed not only at the top of the filter net but also over the entire filter net.

PATENT LITERATURE

Patent Literature 1: Microfilm of JP Utility Model Application No. S60-91902 (JP S62-1714 U)

SUMMARY OF INVENTION

Technical Problems

As described above, in the strainer of Patent Literature 1, the fluid flowing into the strainer flows downward while being swirled by the spiral plate provided inside the screen, so that filtration is performed not only at the top of the filter net but also over the entire filter net. However, in the configuration of Patent Literature 1, since the spiral plate is provided inside the screen, solid foreign matter or the like tends to adhere to the spiral plate. If solid foreign matter or the like adheres to the spiral plate in this manner, the smooth flow of fluid inside the screen may be obstructed by the spiral plate, and there is a possibility that solid foreign matter or the like will rather adhere and accumulate on the upper half of the screen in a concentrated manner.

An object of the present invention is to provide an in-line strainer capable of more reliably preventing the concentrated adhesion and accumulation of solid foreign matter or the like on a portion of a screen.

Solutions to Problems

An in-line strainer according to the present invention includes: a housing 9 having an inflow port 6 through which liquid flows in, an outflow port 7 through which liquid after filtration flows out, and a filter chamber 8 extending from the inflow port 6 to the outflow port 7; and a screen 10 that is installed in the filter chamber 8 and filters the liquid flowing in through the inflow port 6. The housing 9 includes a cylinder wall 24 that is formed in a hollow cylindrical shape and extends in the vertical direction, and a top wall 25 that closes an upper end of the cylinder wall 24. The filter chamber 8 is divided into a primary flow path chamber 39 formed on the upper side and communicating with the inflow port 6 and a secondary flow path chamber 40 formed on the lower side and communicating with the outflow port 7, and a through-hole 38 is provided in an open manner between the two chambers 39 and 40. The screen 10 includes a frusto-conical filter element 33 that is formed in a vertically long hollow cylindrical shape having openings at upper and lower ends, and a bottom lid 34 that closes the lower-end opening of the frusto-conical filter element 33, and an introduction port 36 that allows introduction of liquid is formed at the upper end of the frusto-conical filter element 33. In addition, the screen 10 is disposed in the filter chamber 8, in an orientation such that the introduction port 36 faces the through-hole 38, and the outflow port 7 is provided in an open manner in the cylinder wall 24 that faces the lower half of the frusto-conical filter element 33.

When the extension direction of the cylinder wall 24 is defined as a cylinder axis HC and the extension direction of the frusto-conical filter element 33 is defined as a cylinder axis SC, both axes HC and SC coincide with each other. A swirling protrusion 43 that slopes downward in a spiral shape is provided on the inner peripheral surface of the cylinder wall 24 that defines the secondary flow path chamber 40.

This in-line strainer includes a connecting pipe 44 formed to slope upward while rotating along the outer peripheral surface of the cylinder wall 24 from the outflow port 7. When the housing 9 is viewed from above, the upward-sloping rotational direction of the connecting pipe 44 and the downward-sloping rotational direction of the swirling protrusion 43 formed in the spiral shape are the same rotational direction.

This in-line strainer includes an inflow pipe 11 communicating with the primary flow path chamber 39. The inflow pipe 11 has a cylinder axis IC orthogonal to the cylinder axis HC of the cylinder wall 24. When the housing 9 is viewed from above, the cylinder axis IC of the inflow pipe 11 passes through a position deviated from the cylinder axis HC of the cylinder wall 24.

The inflow port 6 is provided in the cylinder wall 24 defining the primary flow path chamber 39, and a guide wall 42 that guides liquid in the primary flow path chamber 39 toward the secondary flow path chamber 40 is provided at an internal corner between the cylinder wall 24 facing the inflow port 6 and the top wall 25 continuous with the cylinder wall 24.

Advantageous Effects of Invention

In the in-line strainer according to the present invention, the screen 10 is disposed in an orientation such that the introduction port 36 faces the through-hole 38 that is formed between the primary flow path chamber 39 and the secondary flow path chamber 40 of the filter chamber 8, and the outflow port 7 is provided in an open manner in the cylinder wall 24 that faces the lower half of the frusto-conical filter element 33. With this configuration, the liquid fed into the primary flow path chamber 39 through the outflow port 7 flows into the frusto-conical filter element 33 of the screen 10 through the introduction port 36, passes through the frusto-conical filter element 33 while flowing downward, reaches the secondary flow path chamber 40, and is then sent out from the outflow port 7. More specifically, the liquid flowing into the screen 10 flows downward while some of the liquid passes through and out of the frusto-conical filter element 33, and is finally sent out into the secondary flow path chamber 40 from the lower half of the frusto-conical filter element 33 facing the outflow port 7. As described above, the present invention enables the formation of a liquid flow from the upper side to the lower side inside the frusto-conical filter element 33 of the screen 10. Thus, it is possible to suppress solid foreign matter or the like from being filtered out only in a portion of the frusto-conical filter element 33, and to filter out solid foreign matter or the like in the entire frusto-conical filter element 33 in the vertical direction. Therefore, the present invention is capable of more reliably preventing solid foreign matter or the like from adhering to only a portion of the screen 10 and accumulating in that portion in a concentrated manner.

If the cylinder axis SC of the screen 10 installed in the filter chamber 8 and the cylinder axis HC of the cylinder wall 24 coincide with each other, the horizontal spacing distance between the outer surface of the frusto-conical filter element 33 and the inner surface of the cylinder wall 24 facing each other, around the outside of the screen 10 through which the liquid after filtration flows within the secondary flow path chamber 40, can be made constant around the screen 10. Thus, the flow path resistance of the secondary flow path chamber 40 around the outside of the screen 10 can be made substantially uniform in the circumferential direction, so that the liquid can flow more smoothly in the secondary flow path chamber 40. In addition, if the swirling protrusion 43 that slopes downward in a spiral shape toward the bottom wall 26 is provided on the inner peripheral surface of the cylinder wall 24 that defines the secondary flow path chamber 40, the swirling protrusion 43 generates a swirling flow about the cylinder axis HC of the cylinder wall 24 in the liquid that has passed through the frusto-conical filter element 33, thereby allowing the liquid to flow smoothly toward the outflow port 7. If the flow path resistance around the outside of the screen 10 is made substantially uniform and the liquid having passed through the frusto-conical filter element 33 flows smoothly toward the outflow port 7 as described above, it is possible to suppress the disturbance of the liquid flow in the secondary flow path chamber 40 around the outside of the screen 10, so that the pressure loss of the in-line strainer 1 can be reduced. Note that since the flow velocity and pressure of the liquid fluctuate depending on the size of the flow path, in a case where the horizontal spacing distance between the outer surface of the frusto-conical filter element 33 and the inner surface of the cylinder wall 24 varies in size around the screen 10, the flow path resistance is partially changed, resulting in disturbances in the flow of the liquid around the outside of the screen 10.

This in-line strainer includes the connecting pipe 44 formed to slope upward while rotating along the outer peripheral surface of the cylinder wall 24 from the outflow port 7, and when the housing 9 is viewed from above, the upward-sloping rotational direction of the connecting pipe 44 and the downward-sloping rotational direction of the swirling protrusion 43 formed in the spiral shape are the same rotational direction. Thus, the swirling protrusion 43 allows the rotational direction of the liquid swirling around the outside of the screen 10 to match the rotational direction of the liquid from the outflow port 7 toward the connecting pipe 44, thereby allowing the liquid to flow smoothly from the outflow port 7 to the connecting pipe 44. Therefore, it is possible to suppress the pressure loss due to the disturbance of the liquid flow in the connecting pipe 44.

This in-line strainer includes the inflow pipe 11 communicating with the primary flow path chamber 39. The inflow pipe 11 is disposed such that the cylinder axis IC of the inflow pipe 11 is orthogonal to the cylinder axis HC of the cylinder wall 24. When the housing 9 is viewed from above, the cylinder axis IC of the inflow pipe 11 passes through a position deviated from the cylinder axis HC of the cylinder wall 24. Thus, since the liquid can be caused to flow from the tangential direction into the primary flow path chamber 39 (the primary flow path chamber 39 formed in a circular shape when viewed from above (see FIG. 6)), which has a circular cross-section orthogonal to the cylinder axis HC of the cylinder wall 24, so that the liquid flow in the primary flow path chamber 39 can be a swirling flow about the cylinder axis HC of the cylinder wall 24. In addition, the liquid can flow into the inside of the screen 10 through the introduction port 36 while this flow is maintained. As described above, since a swirling liquid flow can be formed inside the screen 10, together with the formation of a downward liquid flow inside the screen 10, the liquid can pass through the entire frusto-conical filter element 33 in the vertical direction and the circumferential direction, and the solid foreign matter or the like can be filtered by the entire frusto-conical filter element 33.

The cylinder wall 24 defining the primary flow path chamber 39 is provided with the inflow port 6, and the guide wall 42 that guides liquid in the primary flow path chamber 39 toward the secondary flow path chamber 40 is provided at the internal corner between the cylinder wall 24 facing the inflow port 6 and the top wall 25 continuous with the cylinder wall 24, thereby allowing the liquid to flow smoothly from the primary flow path chamber 39 to the secondary flow path chamber 40. In addition, the liquid tends to stagnate at the internal corner, and solid foreign matter or the like may aggregate and form a lump. However, by providing the guide wall 42 at the internal corner, the liquid can be prevented from stagnating at the internal corner, thereby preventing the formation of a lump with the solid foreign matter or the like aggregated. Note that when the lump with the solid foreign matter or the like aggregated reaches the screen 10, the lump comes into contact with the frusto-conical filter element 33, resulting in the generation of abnormal noise and breakage of the frusto-conical filter element 33.

DESCRIPTION OF EMBODIMENT

Embodiment

Figure 1:
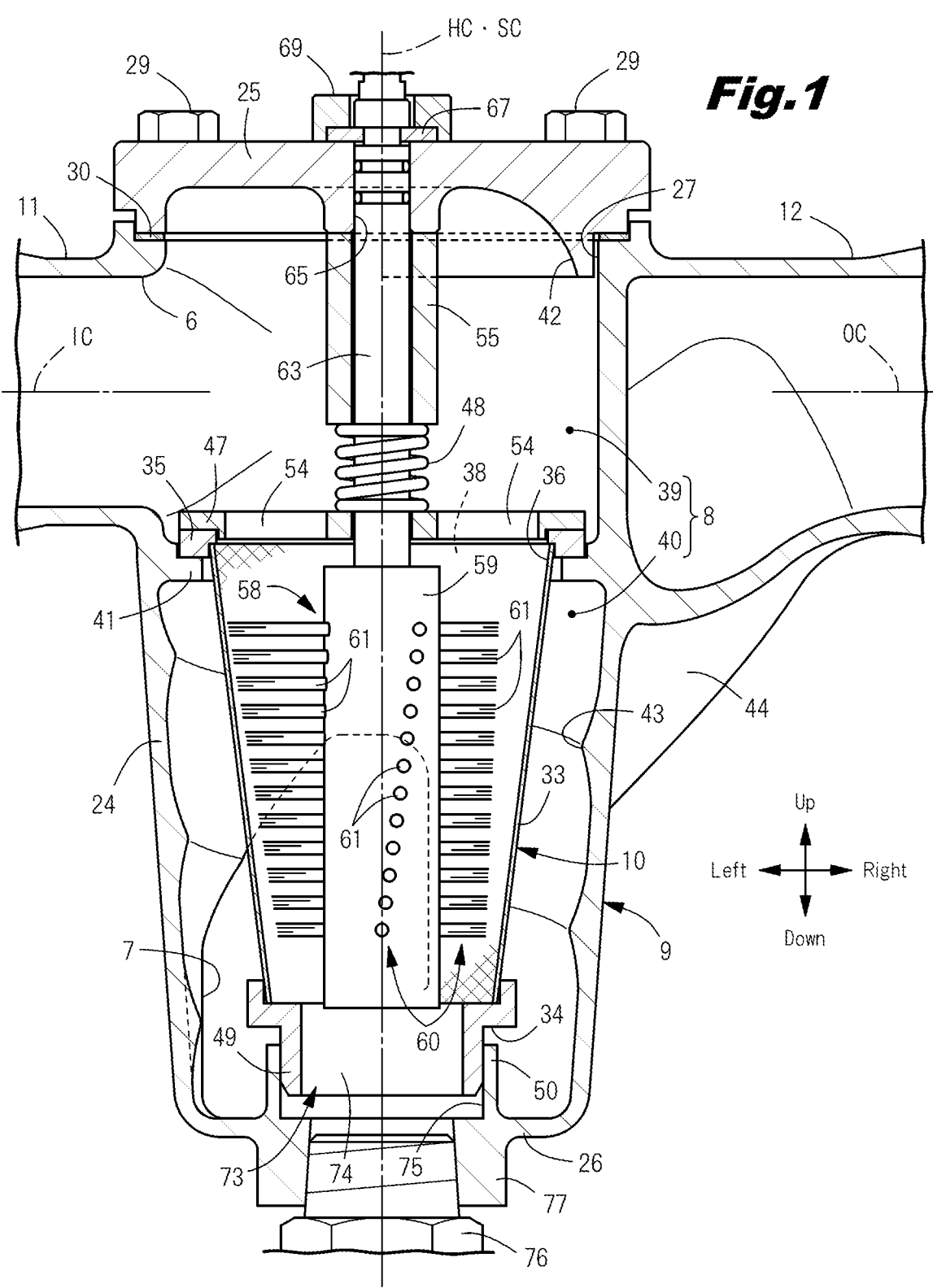
FIG. 1 is a longitudinal sectional front view of the essential parts of an in-line strainer according to an embodiment of the present invention.
Figure 2:
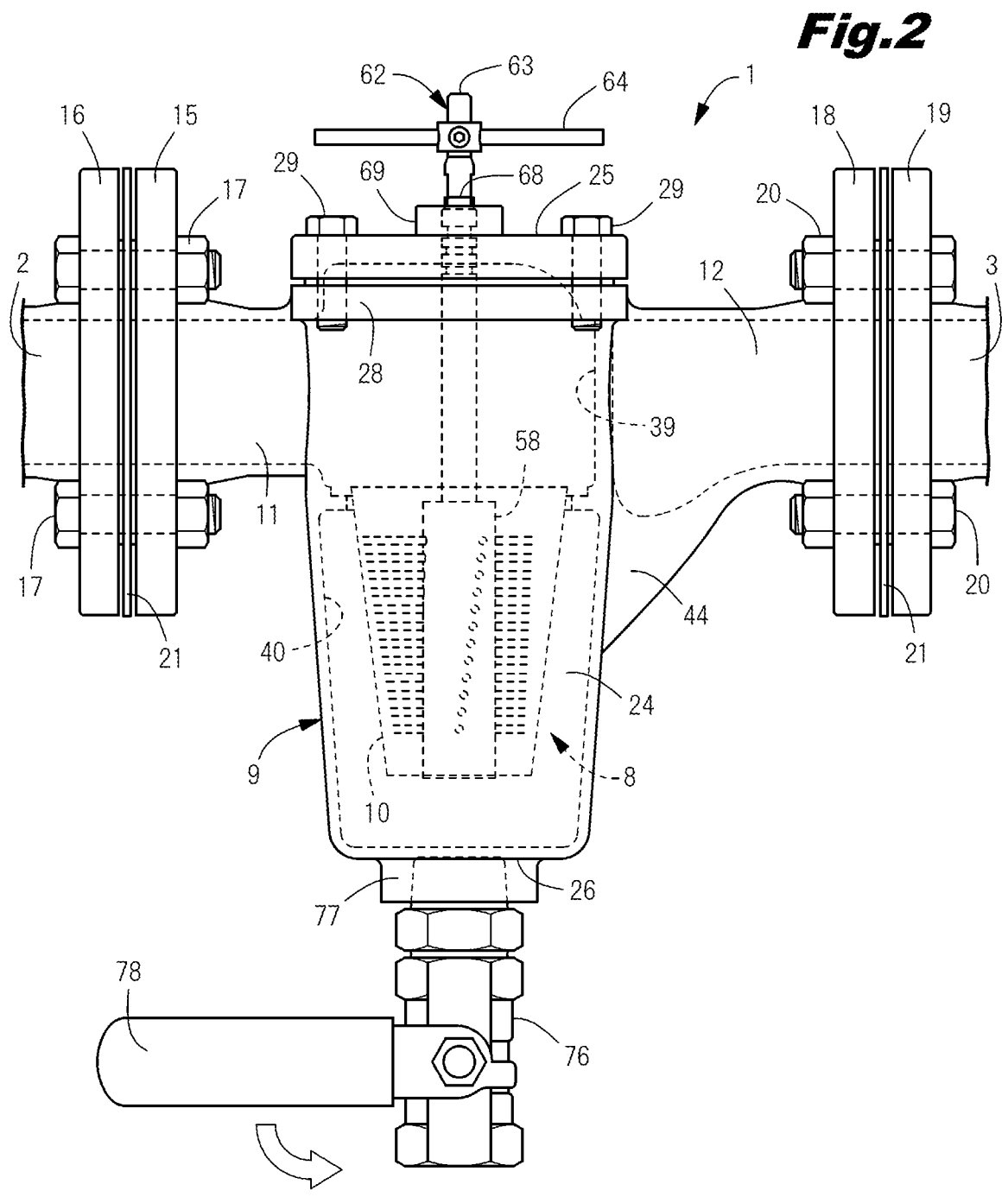
FIG. 2 is a front view of the in-line strainer.

An embodiment of an in-line strainer according to the present invention is illustrated in FIGS. 1 to 8. Front and rear, left and right, and up and down in the present embodiment follow the cross arrows shown in FIGS. 1, 3, and 5 and the front and rear, left and right, and up and down indications in the vicinity of each arrow. As illustrated in FIG. 2, an in-line strainer (hereinafter, simply referred to as "strainer") 1 is disposed between a first transfer pipe 2 on the upstream side and a second transfer pipe 3 on the downstream side, which extend in the left-right direction, and filters liquid flowing through a piping line including the transfer pipes 2 and 3, to remove solid foreign matter or the like contained in the liquid. The first transfer pipe 2 and the second transfer pipe 3 have cylinder axes coaxially arranged.

As illustrated in FIG. 1, the strainer 1 includes: a housing 9 that includes an inflow port 6 through which liquid flows in and an outflow port 7 through which liquid flows out, and has an interior in which a filter chamber 8 communicating with the inflow port 6 and the outflow port 7 is formed; a screen 10 that is installed in the filter chamber 8 and filters the liquid flowing in through the inflow port 6; an inflow pipe 11 that is provided on the left side of the housing 9 and communicates with the inflow port 6; and an outflow pipe 12 that is provided on the right side of the housing 9 and communicates with the outflow port 7.

As illustrated in FIG. 2, the inflow pipe 11 and the outflow pipe 12 extend in the horizontal direction. A cylinder axis IC of the inflow pipe 11 and a cylinder axis OC of the outflow pipe 12 are coaxially arranged. Flanges 15 and 16 are provided at the left end of the inflow pipe 11 and the right end of the first transfer pipe 2, respectively. The inflow pipe 11 and the first transfer pipe 2 are coupled by butting the flanges 15 and 16 of both pipes 11 and 2 together and then fastening the flanges 15 and 16 with a fastener 17 constituted by a bolt and a nut. Similarly, flanges 18 and 19 are provided at the right end of the outflow pipe 12 and the left end of the second transfer pipe 3, respectively. The outflow pipe 12 and the second transfer pipe 3 are coupled by butting the flanges 18 and 19 of both pipes 12 and 3 together and then fastening the flanges 18 and 19 with a fastener 20 constituted by a bolt and a nut. In FIG. 2, reference sign 21 denotes packing for watertightness between the flanges 15 and 16 and between the flanges 18 and 19.

Figure 4:
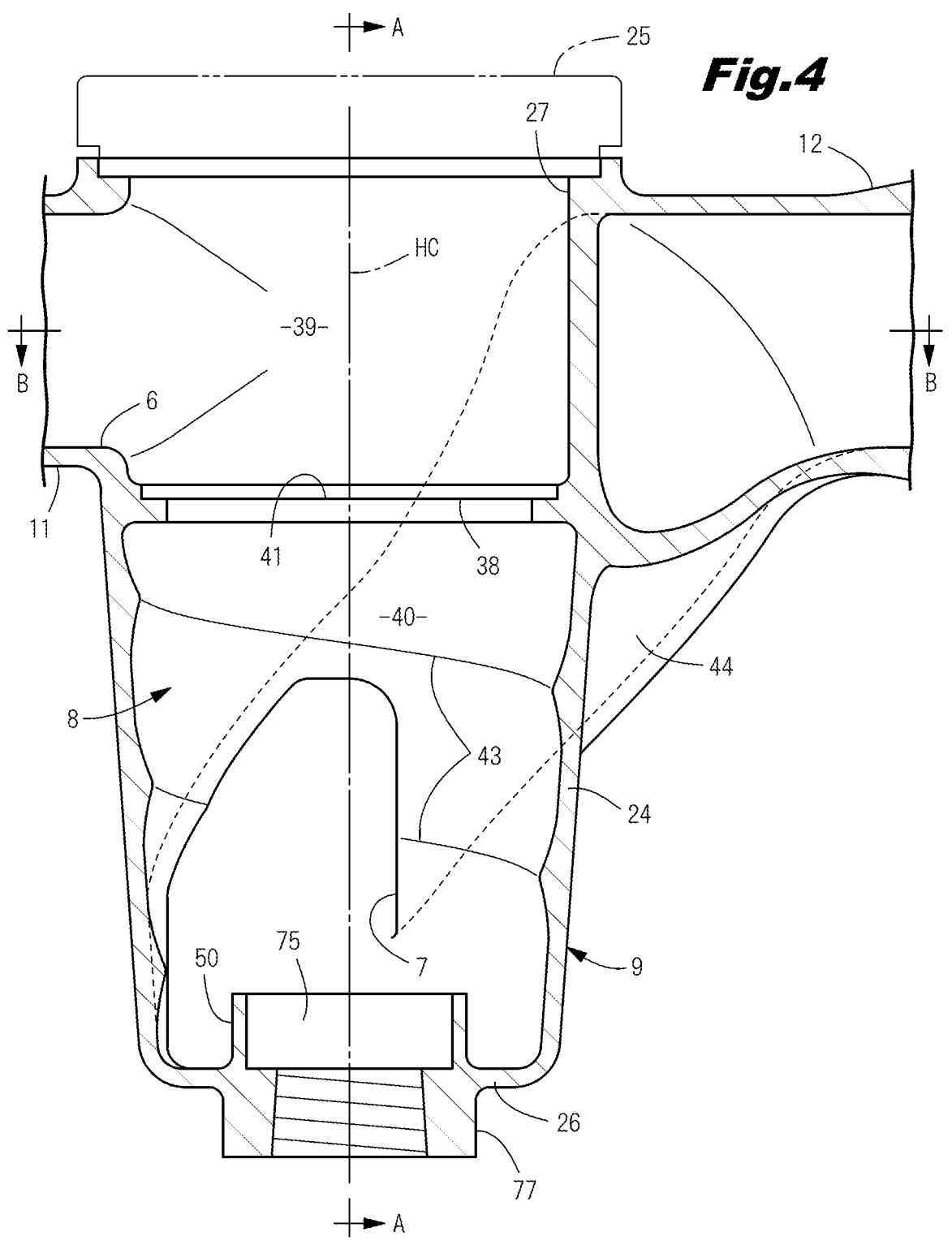
FIG. 4 is a longitudinal sectional front view of a housing.

In FIGS. 1 and 4, the housing 9 includes: a cylinder wall 24 formed in a hollow cylindrical shape with a cylinder axis HC oriented in the vertical direction; a top wall 25 that closes an opening at the upper end of the cylinder wall 24; and a bottom wall 26 that closes an opening at the lower end of the cylinder wall 24. The space surrounded by these walls 24, 25, and 26 is the filter chamber 8. Since the cylinder axis HC of the cylinder wall 24 is oriented in the vertical direction, the cylinder axes IC and OC of the inflow pipe 11 and the outflow pipe 12 are orthogonal to the cylinder axis HC of the cylinder wall 24. The top wall 25 is configured as a lid that opens and closes the upper-end opening of the cylinder wall 24, and can be attached to and detached from the cylinder wall 24. The upper-end opening of the cylinder wall 24 serves as an access port 27 for accessing the interior of the filter chamber 8, and the access port 27 can be closed by fixing the top wall 25 to the cylinder wall 24. Further, by separating the top wall 25 from the cylinder wall 24, the access port 27 can be opened.

Figure 3:
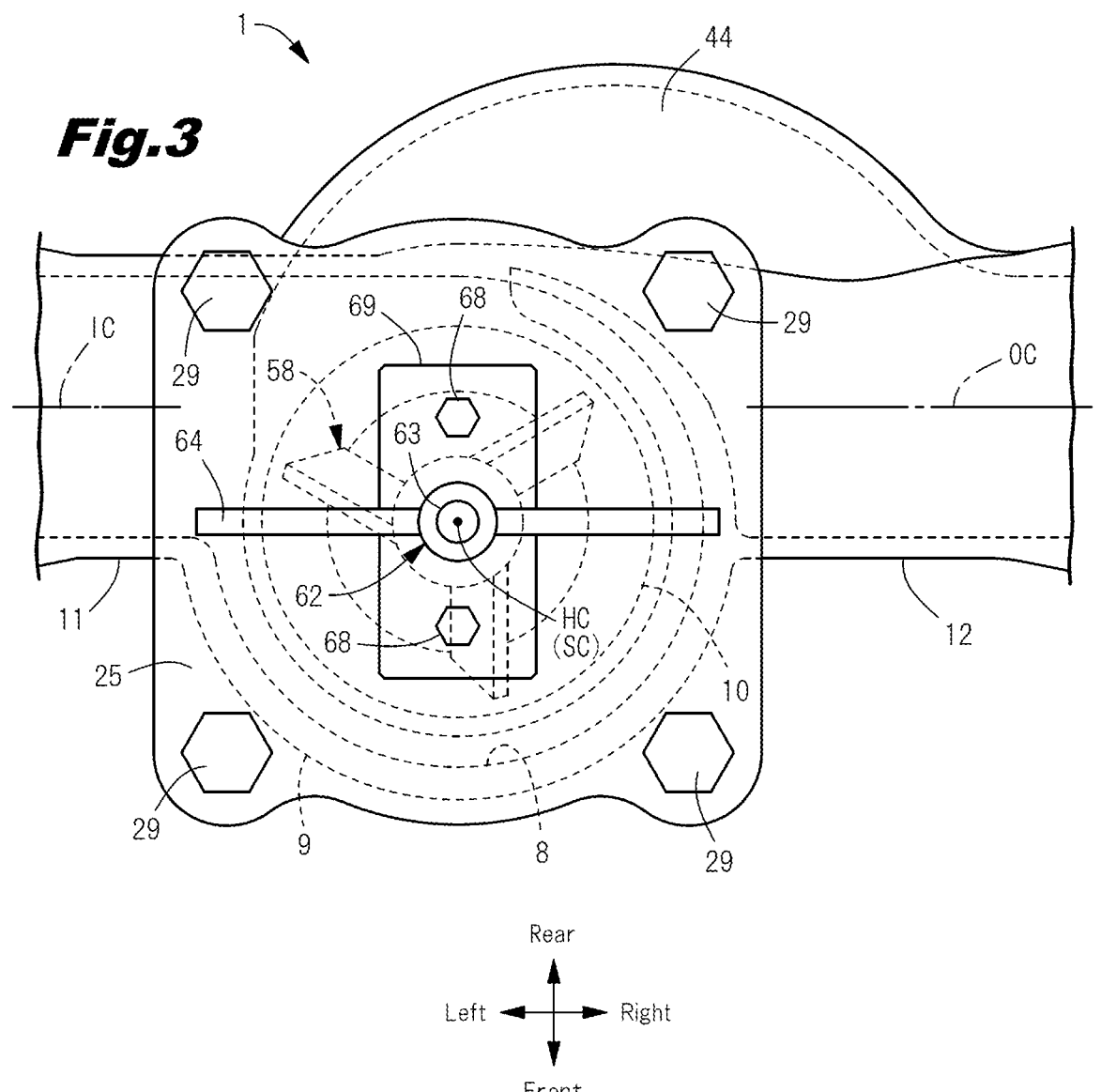
FIG. 3 is a plan view of the in-line strainer.

As illustrated in FIGS. 2 and 3, the top wall 25, which is configured as the lid for the access port 27, is fixed to the cylinder wall 24 by fastening its four corners to a substantially square-framed flange wall 28, which is formed to extend outwardly from the upper end of the cylinder wall 24, with fastening bolts 29 that are hexagonal bolts. When attaching and detaching the screen 10 or inspecting the interior of the filter chamber 8, the user can access the interior of the filter chamber 8 from above the housing 9 by loosening the fastening bolts 29, separating the top wall 25 from the cylinder wall 24, and opening the access port 27. After the attachment and detachment of the screen 10 or the inspection of the interior of the filter chamber 8, the user can seal the filter chamber 8 by placing the top wall 25 over the access port 27 and tightening the fastening bolts 29. In FIG. 1, reference sign 30 denotes packing for watertightness between the upper end edge of the cylinder wall 24 and the top wall 25.

As illustrated in FIG. 1, the screen 10 includes: a frusto-conical filter element 33 formed in a hollow cylindrical shape with a cylinder axis SC oriented in the vertical direction; a bottom lid 34 that closes the lower-end opening of the frusto-conical filter element 33; and a fixing ring 35 provided at the upper end of the frusto-conical filter element 33. The screen 10 is formed in a bottomed cylindrical shape having an introduction port 36 at the upper end, the introduction port 36 introducing the liquid flowing into the filter chamber 8 through the inflow port 6 into the interior of the frusto-conical filter element 33. The frusto-conical filter element 33 is made of stainless steel mesh having a large number of micropores, and is formed entirely in the shape of a tapered cylinder that is tapered downward. The bottom lid 34 is formed in a flat round dish shape and is integrally fixed to the lower end edge of the frusto-conical filter element 33 in an outer fitting manner. The fixing ring 35 is used for fixing the screen 10 to the filter chamber 8, is formed in an annular shape, and is integrally fixed to the upper end edge of the frusto-conical filter element 33 in an outer fitting manner. The frusto-conical filter element 33 is held in shape by the fixing ring 35 and the bottom lid 34 respectively fixed to the upper and lower ends thereof.

The filter chamber 8 is divided into a primary flow path chamber 39 on the upper side through which the liquid before filtration flows and a secondary flow path chamber 40 on the lower side where the screen 10 is disposed and through which the liquid before and after passing through the frusto-conical filter element 33 flows. An annular fixing seat 41 is formed on the inner peripheral surface of the cylinder wall 24 slightly above the center in the vertical direction so as to overhang inward. The area above the fixing seat 41 is the primary flow path chamber 39 and the area below the fixing seat 41 is the secondary flow path chamber 40. The cylinder wall 24 defining the primary flow path chamber 39 is formed in the shape of a straight cylinder having uniform outer peripheral dimensions in the vertical direction, and the cylinder wall 24 defining the secondary flow path chamber 40 is formed in the shape of a tapered cylinder that is tapered downward. A through-hole 38 that allows liquid to flow is formed between the primary flow path chamber 39 and the secondary flow path chamber 40, and in the present embodiment, the inner side of the fixing seat 41 is the through-hole 38.

The screen 10 is installed in the filter chamber 8 by being dropped into secondary flow path chamber 40 through the through-hole 38. At this time, the fixing ring 35 is received by the fixing seat 41, so that the downward movement limit of the screen 10 is restricted. In such an installation state, the introduction port 36 of the screen 10 faces the through-hole 38. Further, the cylinder axis SC of the screen 10 coincides with the cylinder axis HC of the cylinder wall 24. If the screen 10 and the cylinder wall 24 are arranged so that the cylinder axis SC of the screen 10 and the cylinder axis HC of the cylinder wall 24 coincide with each other as described above, the horizontal spacing distance between the outer surface of the frusto-conical filter element 33 and the inner surface of the cylinder wall 24 facing each other, around the outside of the screen 10 through which the liquid after filtration flows within the secondary flow path chamber 40, can be made constant around the screen 10.

Figure 6:
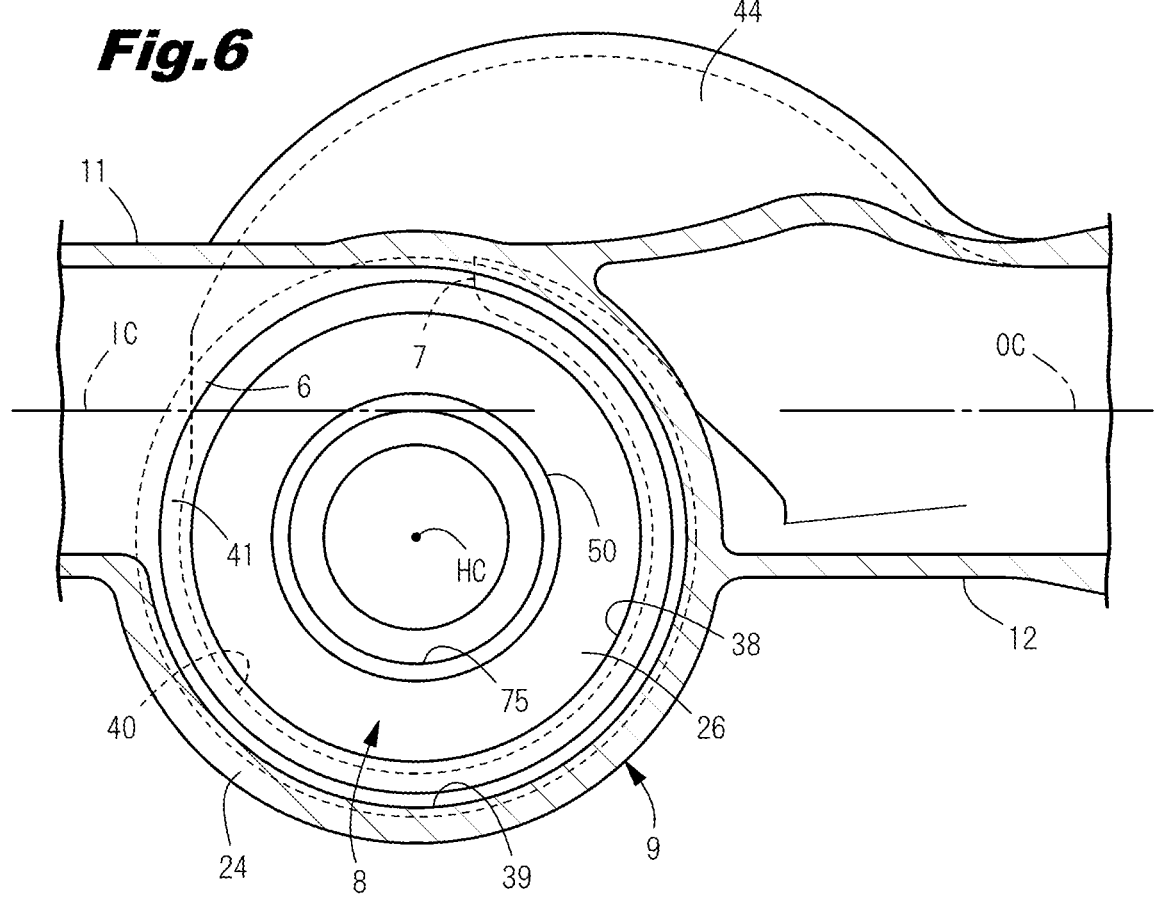
FIG. 6 is a sectional view taken along line B-B in FIG. 4.

As illustrated in FIG. 6, the inflow port 6 which serves to allow liquid to flow into the filter chamber 8, is provided in an open manner in the cylinder wall 24 that faces the primary flow path chamber 39. Specifically, the inflow port 6 is provided at the center in the vertical direction on the left rear peripheral surface of the cylinder wall 24 that defines the primary flow path chamber 39. The inflow pipe 11 extending in the left-right direction communicates with the inflow port 6, and when the housing 9 is viewed from above, the cylinder axis IC of the inflow pipe 11 passing through the center of the inflow port 6 is disposed so as to pass through a position deviated rearward from the cylinder axis HC of the cylinder wall 24.

As described above, if the cylinder axis IC of the inflow pipe 11 passes through the position deviated from the cylinder axis HC of the cylinder wall 24, the liquid can be caused to flow from the tangential direction into the primary flow path chamber 39, which has a circular cross-section orthogonal to the cylinder axis HC of the cylinder wall 24 (see FIG. 6), so that the liquid can be guided along the inner surface of the cylinder wall 24 to generate a swirling flow about the cylinder axis HC of the cylinder wall 24 in the primary flow path chamber 39. The liquid thus formed into a swirling flow in the primary flow path chamber 39 flows into the frusto-conical filter element 33 from the introduction port 36 while maintaining the flow (swirling flow). Therefore, a swirling flow can be applied to the liquid even in the screen 10. In the present embodiment, since the configuration is such that the cylinder axis IC of the inflow pipe 11 disposed at the left rear side of the cylinder wall 24 passes behind the cylinder axis HC of the cylinder wall 24 (see FIG. 6), a flow swirling in the clockwise direction (rightward direction) occurs in the primary flow path chamber 39 when the housing 9 is viewed from above.

Figure 8:
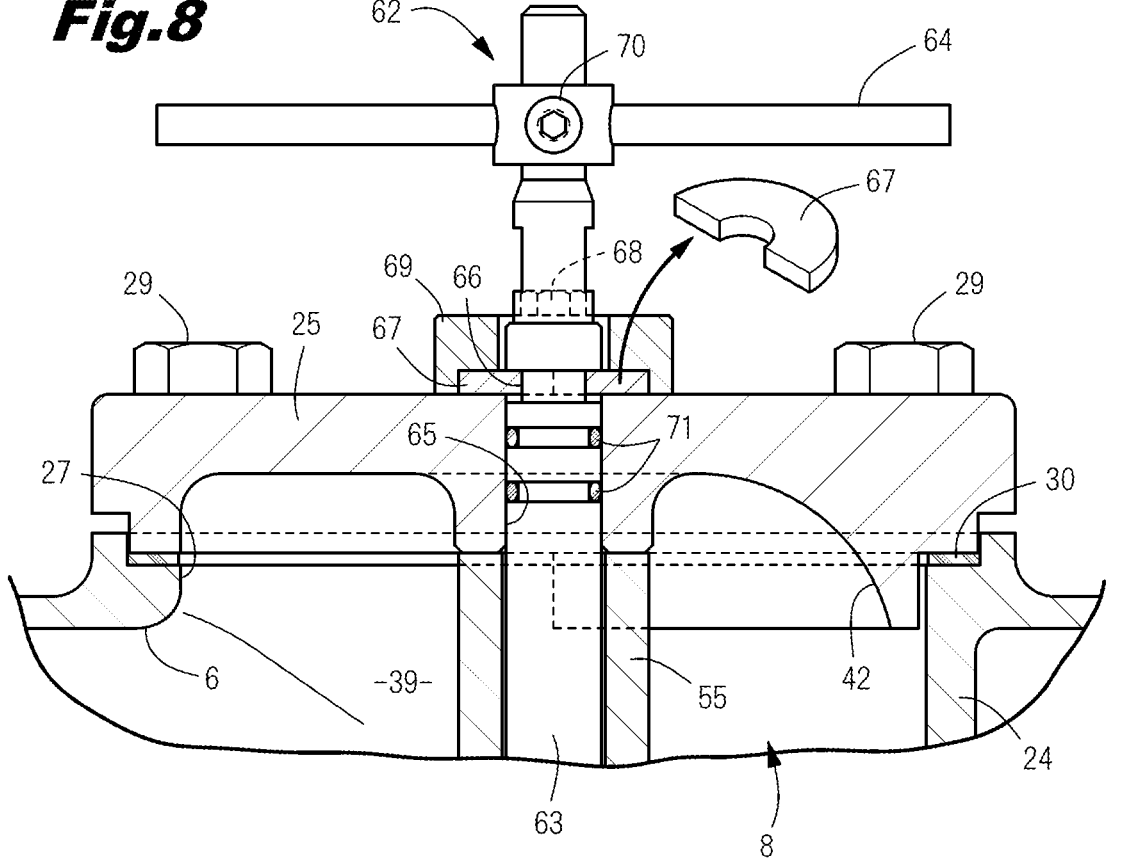
FIG. 8 is a longitudinal sectional front view illustrating the coupling portion between a cylinder wall and a top wall.

As illustrated in FIG. 8, a guide wall 42 that guides liquid in the primary flow path chamber 39 toward the secondary flow path chamber 40 (lower side) is provided at the internal corner between the cylinder wall 24 on the side facing the inflow port 6 and the top wall 25 continuous with the cylinder wall 24. The guide wall 42 is provided on the lower surface of the top wall 25 continuous to the cylinder wall 24 side facing the inflow port 6, and is formed on the lower surface of the right half of the top wall 25 in the present embodiment. The guide wall 42 is formed to protrude downward in a semi-cylindrical shape, and the inner peripheral surface thereof is formed in the shape of a quarter circular arc. The liquid flowing into the primary flow path chamber 39 is deflected and guided downward on the inner peripheral surface of the guide wall 42, and the flow force toward the secondary flow path chamber 40 is enhanced.

Figure 5:
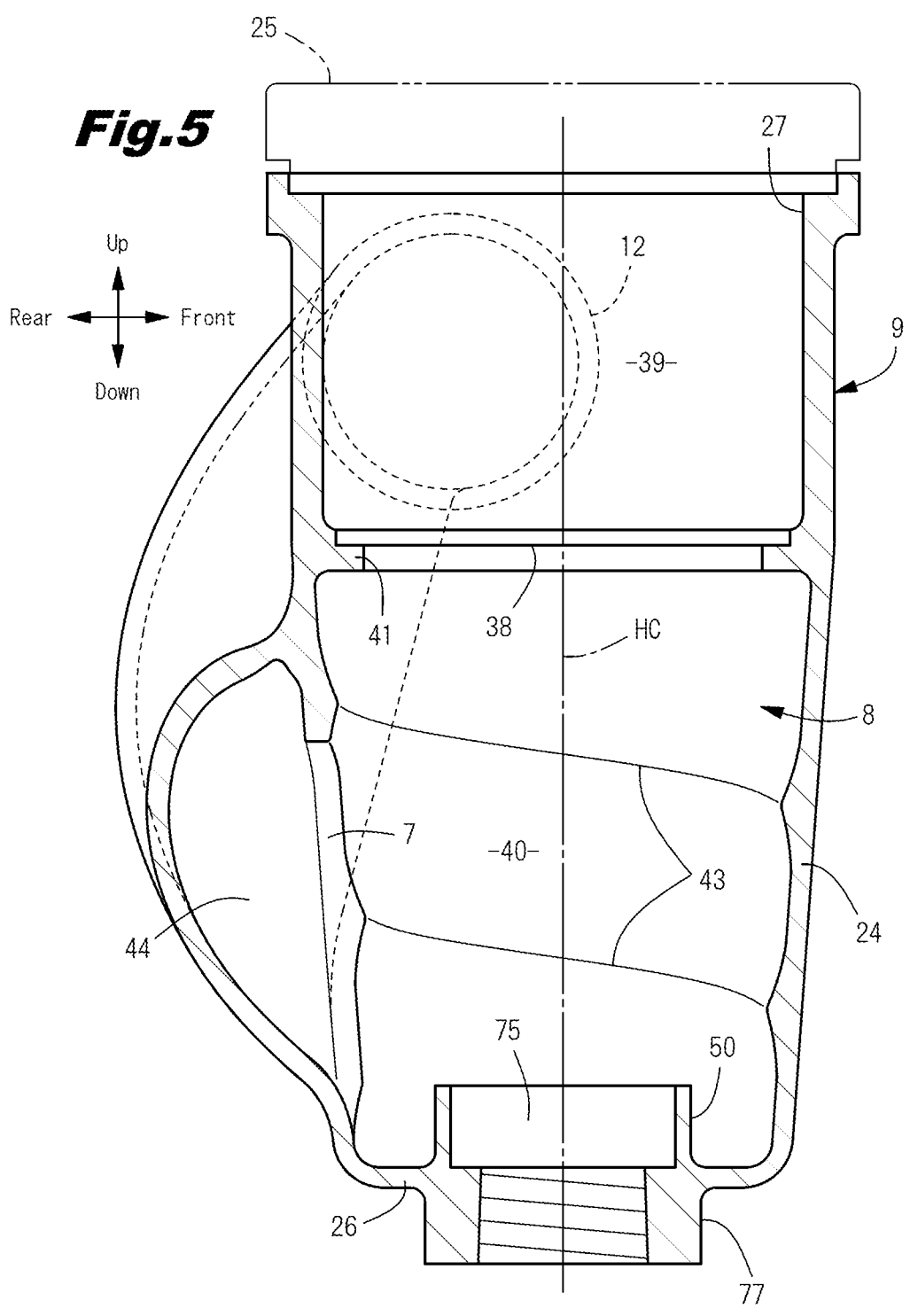
FIG. 5 is a sectional view taken along line A-A in FIG. 4.

As illustrated in FIGS. 4 and 5, a swirling protrusion 43 that slopes downward in a spiral shape toward the bottom wall 26 is formed on the inner peripheral surface of the cylinder wall 24 that defines the secondary flow path chamber 40. The swirling protrusion 43 is a flattened, hemispreading protrusion, the cross section of which protrudes toward the cylinder axis HC of the cylinder wall 24, and is formed in a spiral shape that slopes downward toward the bottom wall 26 as going in the clockwise direction (rightward direction) when the housing 9 is viewed from above. When the swirling protrusion 43 is formed on the cylinder wall 24 in this manner, the concave surface formed between the swirling protrusions 43 and 43, which are adjacent to each other in the vertical direction, guides the liquid, and thus it is possible to maintain or enhance the flow force of the swirling flow generated in the primary flow path chamber 39.

The outflow port 7 through which liquid flows out from the filter chamber 8 is provided in an open manner in the cylinder wall 24 that faces the lower half of the frusto-conical filter element 33. Specifically, on the left rear peripheral surface of the cylinder wall 24 that defines the secondary flow path chamber 40, the outflow port 7 is provided in an open manner, from the lower end of the cylinder wall 24 slightly above the center of the secondary flow path chamber 40 in the vertical direction. Furthermore, the outflow port 7 faces the side of the screen 10, which is installed in the filter chamber 8, below the vertical center.

In FIGS. 3 and 4, reference sign 44 denotes a connecting pipe 44 having one end communicating with the outflow port 7 and the other end communicating with the outflow pipe 12. The connecting pipe 44 is formed to bulge on the outer peripheral surface of the rear half of the cylinder wall 24, and is formed to slope upward while rotating in the clockwise direction (rightward direction) along the outer peripheral surface of the cylinder wall 24 from the outflow port 7 to the outflow pipe 12. When the housing 9 is viewed from above, the upward-sloping rotational direction of the connecting pipe 44 is set to the same rotational direction as the downward-sloping rotational direction of the spirally-shaped swirling protrusion 43. The outflow pipe 12-side end of the connecting pipe 44 is connected to the lower surface of the base end of the outflow pipe 12.

The screen 10 installed in the filter chamber 8 is detachably held by a screen holding structure. In FIG. 1, the screen holding structure includes: a pressing plate 47 that holds the fixing ring 35 in the vertical direction in cooperation with the fixing seat 41; a pressure spring 48 which is a torsion coil spring that biases the pressing plate 47 toward the fixing seat 41; a first boss 49 provided on the lower surface of the bottom lid 34 of the screen 10; and a second boss 50 provided on the upper surface of the bottom wall 26 of the cylinder wall 24 and fitted inside and outside with the first boss 49. The first boss 49 is formed in a cylindrical shape, and the second boss 50 is formed in a cylindrical shape into which the first boss 49 fits. When both the bosses 49 and 50 fit together, the misalignment of the bottom lid 34 with respect to the cylinder wall 24 in the front-rear and left-right directions is restricted.

Figure 7:
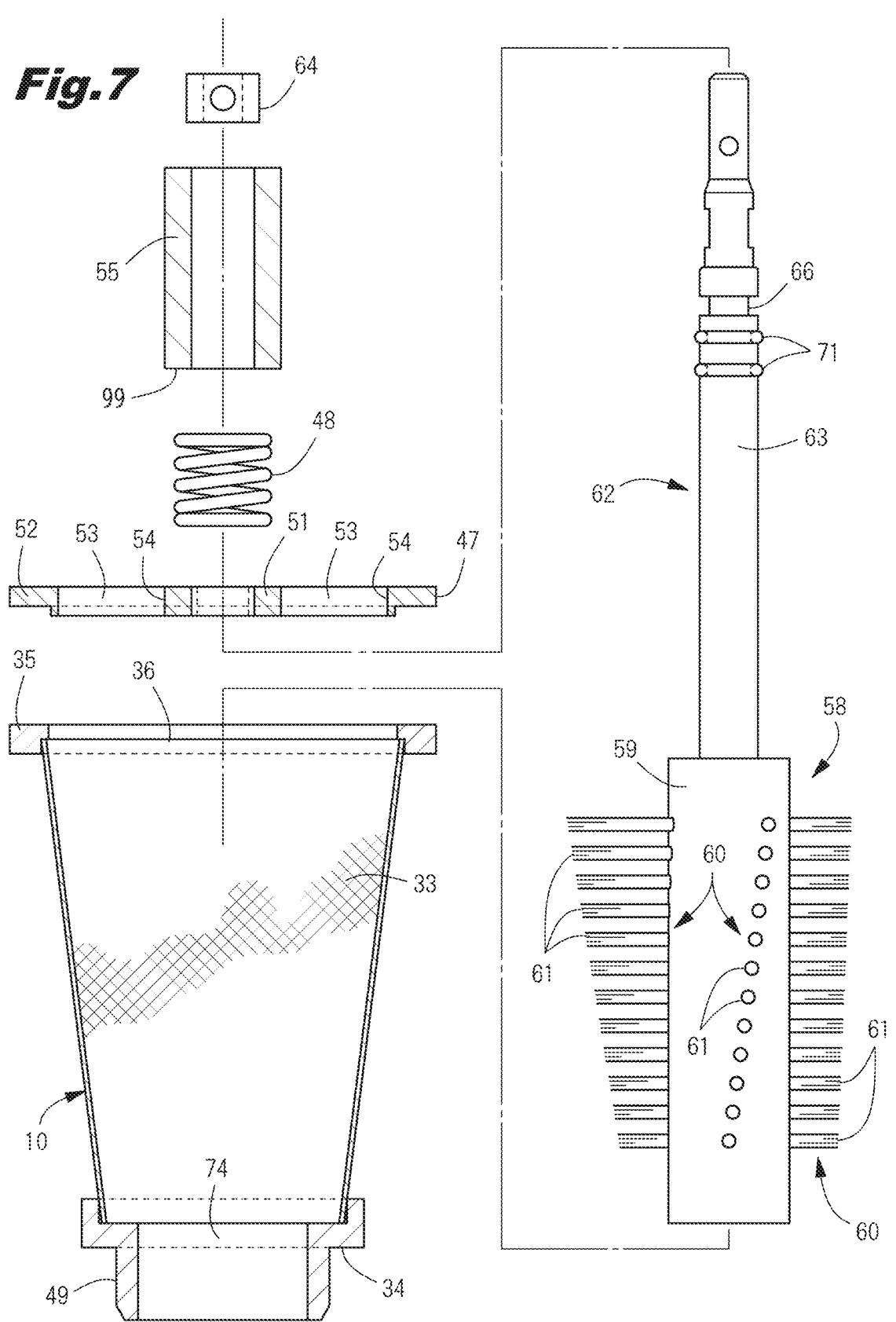
FIG. 7 is an exploded front view of an internal structure.

As illustrated in FIG. 7, the pressing plate 47 includes an inner ring 51 that receives the pressure spring 48, an outer ring 52 that contacts the fixing ring 35, and a plurality of bridge pieces 53 that are radially provided and interconnect the inner and outer rings 51 and 52. The inner and outer rings 51 and 52 are concentric ring bodies, and the pressing plate 47 is formed with a plurality of through liquid passage holes 54, which are surrounded by the inner and outer rings 51 and 52 and adjacent bridge pieces 53 and 53. The liquid in the primary flow path chamber 39 passes through the liquid passage holes 54 to the interior of the frusto-conical filter element 33 through the introduction port 36.

The pressure spring 48 is installed between the lower surface of the top wall 25 and the upper surface of the inner ring 51 together with a hollow cylindrical pressing shaft 55 having a bottom end face surface (99), disposed on the upper side of the pressure spring 48. As illustrated in FIG. 1, the upper end of the pressing shaft 55 is received by the top wall 25, and the biasing force of the pressure spring 48 is applied to the fixing ring 35 through the pressing plate 47. The fixing ring 35 is held between the fixing seat 41 and the outer ring 52 in the vertical direction by the biasing force, and the vertical misalignment of the screen 10 with respect to the cylinder wall 24 is restricted. As described above, the screen 10 is installed in the secondary flow path chamber 40 of the filter chamber 8, with its position in the front-rear and left-right directions held by the first and second bosses 49 and 50 that fit inside and outside, and its vertical position held by the fixing seat 41 and the outer ring 52 that hold the fixing ring 35 therebetween.

A cleaning brush 58 for scraping off the filter residues adhering to the inner surface of the-frusto-conical filter element 33 is provided inside the screen 10. As illustrated in FIG. 7, the cleaning brush 58 includes a brush shaft 59 that extends in the direction coinciding with the cylinder axis SC of the screen 10, and three (a plurality of) bristle bundle rows 60 that are provided on the outer peripheral surface of the brush shaft 59 and contact the inner surface of the frusto-conical filter element 33. Each of the bristle bundle rows 60 is constituted by a plurality of bundled unit bristle bundles 61 aligned in the vertical direction. Furthermore, when the cleaning brush 58 is viewed from above, each of the bristle bundle rows 60 is disposed in a spiral shape with the tips of the unit bristle bundles 61 gradually shifting around the brush shaft 59 toward the bottom. In the present embodiment, each of the bristle bundle rows 60 has a spiral shape with the tips of the unit bristle bundles 61 rotating in the clockwise direction (rightward) toward the bottom.

The direction of swirling of the liquid in the primary flow path chamber 39 and the direction of swirling of the liquid around the outside of the screen 10 as caused by the swirling protrusion 43 are preferably the same direction. This is because the different swirling directions of the liquid cause disturbances in the flow, which increases the pressure loss of the strainer 1. Note that, if the rotational direction of the unit bristle bundles 61 arranged in a spiral shape is set to the same direction as the direction of swirling of the liquid by the swirling protrusion 43, as in the present embodiment, the liquid can flow along each of the bristle bundle rows 60, so that it is possible to effectively prevent the flow force of the liquid from being impaired in the secondary flow path chamber 40.

The cleaning brush 58 can be operated by a handle 62 disposed on the upper outside of the housing 9. The handle 62 includes a handle shaft 63 provided coaxially with the upper end of the brush shaft 59 and extending upward to the outside of the housing 9, and an operation handle 64 provided at the upper end of the handle shaft 63. The handle shaft 63 is a shaft body having a diameter smaller than that of the brush shaft 59, and, as illustrated in FIG. 1, is continuously extended to the outside of the housing 9 through the inner hole in the inner ring 51, the inside of the pressure spring 48, the interior of the cylinder of the pressing shaft 55, and a shaft hole 65 that is formed in a vertically penetrating manner in the top wall 25.

The handle shaft 63 is supported so as to be rotatable but vertically immovable with respect to the top wall 25. Specifically, an annular collar groove 66 is formed in a recessed manner in the handle shaft 63 in the top wall 25 region, and a pair of semi-annular collars 67 is fitted into the collar groove 66 so as to sandwich the handle shaft 63, whereby the handle shaft 63 is supported so as to be rotatable but vertically immovable with respect to the top wall 25. The pair of collars 67 are fixed to the upper surface of the top wall 25 by a collar presser 69 that is fixed by fixing bolts 68. The operation handle 64 includes a pair of rod bodies extending in opposite directions with the handle shaft 63 interposed therebetween, and can be attached to and detached from the handle shaft 63. In FIG. 8, reference sign 70 denotes a fixing screw for fixing the operation handle 64 to the handle shaft 63, and reference sign 71 denotes a seal ring for sealing the gap between the handle shaft 63 and the shaft hole 65.

The strainer 1 includes a drain line 73 for discharging the filter residues scraped off by the cleaning brush 58 to the outside of the housing 9 together with the liquid. The drain line 73 is constituted by an upper discharge flow path 74 and a lower discharge flow path 75 that are vertically connected, and is formed to extend from the interior of the screen 10 to the lower outside of the housing 9. A drain valve 76 that opens and closes the drain line 73 is provided at the end of the drain line 73, that is, at the downstream end of the lower discharge flow path 75.

The upper discharge flow path 74 is constituted by a vertical through-hole extending from the upper surface of the bottom lid 34 to the lower surface of the first boss 49. Furthermore, the lower discharge flow path 75 is constituted by a vertical through-hole that extends from the upper surface of the second boss 50 to the lower surface of the valve boss 77 formed to protrude from the lower surface of the bottom wall 26. The inner surface of the lower discharge flow path 75 in the valve boss 77 region is an internally threaded hole. The upper discharge flow path 74 and the lower discharge flow path 75, which constitute the drain line 73, are connected by fitting the first boss 49 and the second boss 50 together. In the present embodiment, since the upper discharge flow path 74 is formed in the bottom lid 34, the configuration is such that the bottom lid 34, the first and second bosses 49 and 50, the bottom wall 26, and the drain valve 76 close the lower-end opening of the frusto-conical filter element 33 in cooperation with each other. Note that, in the strainer 1 without the drain line 73, the lower-end opening of the frusto-conical filter element 33 can be closed with the bottom lid 34.

The drain valve 76 is screwed from below into the valve boss 77, and the valve body inside can be operated by manually turning a lever 78. When the lever 78 is in a horizontal position as illustrated in FIG. 2, the valve body of the drain valve 76 is in a closed position to close the flow path in the drain valve 76. As the lever 78 is turned downward from the horizontal position, the valve body of the drain valve 76 can be operated to an open position to open the flow path in the valve 76. When the lever 78 is turned 90 degrees from the horizontal position to a vertical position, the valve body of the drain valve 76 is brought into a fully open state.

The liquid flows in the strainer 1 as follows, and solid foreign matter or the like in the liquid is removed. The liquid flowing through the piping line and entering the primary flow path chamber 39 of the filter chamber 8 from the inflow port 6 through the inflow pipe 11 is turned into a flow swirling about the cylinder axis HC of the cylinder wall 24 in the primary flow path chamber 39, and is further guided to the secondary flow path chamber 40 on the lower side by the guide wall 42 to reach the introduction port 36 of the screen 10. The liquid introduced into the frusto-conical filter element 33 from the introduction port 36 of the screen 10 while the swirling flow is maintained flows toward the outflow port 7, that is, toward the lower side of the secondary flow path chamber 40, and passes through the frusto-conical filter element 33 by the centrifugal force of the flow, and solid foreign matter or the like contained in the liquid is filtered out. The filtered liquid flowing around the outside of the screen 10 reaches the outflow port 7 while the swirling flow is maintained or enhanced by the swirling protrusion 43. The liquid that has reached the outflow port 7 flows through the connecting pipe 44 to the outflow pipe 12, and again flows through the piping line.

The components of the piping line, including the strainer 1, are periodically inspected and cleaned. Such periodic inspection and cleaning are performed while the operation of the piping line is stopped, so that the strainer 1 can be disassembled and cleaned. To clean the strainer 1 by disassembly, the top wall 25 is unfastened by loosening the fastening bolts 29, and the top wall 25 is separated from the cylinder wall 24. At this time, the cleaning brush 58, the pressing plate 47 into which the handle shaft 63 is inserted, the pressure spring 48, and the pressing shaft 55 are simultaneously removed from the housing 9 along with the handle 62 supported by the top wall 25. In addition, by removing the pressing plate 47 from the housing 9, the screen 10 released from being held by the pressing plate 47 can be removed from the housing 9.

The components integrally configured together with the top wall 25 can be disassembled into the top wall 25, the handle shaft 63 to which the cleaning brush 58 is coupled, the operation handle 64, the pressing plate 47, the pressure spring 48, and the pressing shaft 55 by loosening the fixing screw 70 to separate the operation handle 64 from the handle shaft 63 and loosening the fixing bolt 68 to separate the collar presser 69 and the collars 67 from the top wall 25. After cleaning the disassembled components, the components are attached to the housing 9 by the reverse procedure, thereby completing the cleaning by disassembly.

The strainer 1 according to the present embodiment, including the drain line 73, makes it possible to clean the screen 10 in a simplified manner even during normal operating conditions. First, the lever 78 in the horizontal position is slowly turned downward to gradually operate the valve body of the drain valve 76 toward the open position. When the liquid starts to be discharged from the drain valve 76, the operation handle 64 is rotated about the handle shaft 63, and the cleaning brush 58 is used to scrape off solid foreign matter or the like stuck to the inner surface of the frusto-conical filter element 33. The scraped-off filter residues are discharged together with the liquid to the outside of the housing 9 through the drain line 73. When no filter residues can be seen in the discharged liquid, the simple cleaning of the screen 10 is completed, and then the lever 78 is turned to the horizontal position to close the drain line 73 and finish the cleaning of the screen 10. At this time, it is recommended to place a bucket or the like below the drain valve 76 in advance, and use the bucket or the like to receive the liquid containing solid foreign matter or the like discharged from the drain line 73.

As described above, in the strainer 1 according to the present embodiment, the screen 10 is disposed in an orientation such that the introduction port 36 faces the through-hole 38 that is formed between the primary flow path chamber 39 and the secondary flow path chamber 40 of the filter chamber 8, and in addition, the outflow port 7 is provided in an open manner in the cylinder wall 24 that faces the lower half of the-frusto-conical filter element 33, so that a flow of liquid from the upper side to the lower side can be formed inside the screen 10. If the flow of the liquid from the upper side to the lower side can be formed inside the screen 10 as described above, it is possible to suppress solid foreign matter or the like from being filtered out only in a portion of the frusto-conical filter element 33, and to filter out solid foreign matter or the like in the entire frusto-conical filter element 33 in the vertical direction. Therefore, it is possible to more reliably prevent the solid foreign matter or the like from adhering to only a portion of the frusto-conical filter element 33 and accumulating in that portion in a concentrated manner, and to prevent early local clogging of the frusto-conical filter element 33 due to the filter residues. As described above, the strainer 1 according to the present embodiment can prevent early local clogging of the frusto-conical filter element 33, and thus, it is possible to prolong the cleaning cycle and to suppress maintenance efforts and a decrease in the operation rate of the piping line.

Since the cylinder axis SC of the screen 10 installed in the filter chamber 8 is disposed so as to coincide with the cylinder axis HC of the cylinder wall 24, the horizontal spacing distance between the outer surface of the frusto-conical filter element 33 and the inner surface of the cylinder wall 24 facing each other, around the outside of the screen 10 through which the liquid after filtration flows within the secondary flow path chamber 40, can be made constant around the screen 10, and the flow path resistance of the secondary flow path chamber 40 around the outside of the screen 10 can be made substantially uniform in the circumferential direction. In addition, since the swirling protrusion 43 that slopes downward in a spiral shape toward the bottom wall 26 is provided on the inner peripheral surface of the cylinder wall 24 that defines the secondary flow path chamber 40, the swirling protrusion 43 generates a swirling flow about the cylinder axis HC of the cylinder wall 24 in the liquid that has passed through the frusto-conical filter element 33, thereby allowing the liquid to flow smoothly toward the outflow port 7. If the flow path resistance around the outside of the screen 10 is made substantially uniform and the liquid having passed through the frusto-conical filter element 33 flows smoothly toward the outflow port 7 as described above, it is possible to prevent the disturbance of the liquid flow in the secondary flow path chamber 40 around the outside of the screen 10, so that the pressure loss of the in-line strainer 1 can be reduced.

The outflow port 7 and the outflow pipe 12 communicate with each other through the connecting pipe 44 that is formed to slope upward while rotating along the outer peripheral surface of the cylinder wall 24 from the outflow port 7 toward the outflow pipe 12. When the housing 9 is viewed from above, the upward-sloping rotational direction of the connecting pipe 44 and the downward-sloping rotational direction of the swirling protrusion 43 formed in the spiral shape are the same rotational direction. Thus, the swirling protrusion 43 allows the rotational direction of the liquid swirling around the outside of the screen 10 to match the rotational direction of the connecting pipe 44 from the outflow port 7 toward the outflow pipe 12, thereby allowing the liquid to flow smoothly from the outflow port 7 to the outflow pipe 12 through the connecting pipe 44. Therefore, it is possible to suppress the pressure loss due to the disturbance of the liquid flow in the connecting pipe 44.

This in-line strainer includes the inflow pipe 11 communicating with the primary flow path chamber 39. The inflow pipe 11 is disposed such that the cylinder axis IC of the inflow pipe 11 is orthogonal to the cylinder axis HC of the cylinder wall 24. When the housing 9 is viewed from above, the cylinder axis IC of the inflow pipe 11 passes through a position deviated from the cylinder axis HC of the cylinder wall 24. Thus, since the liquid can be caused to flow from the tangential direction into the primary flow path chamber 39 (the primary flow path chamber 39 formed in a circular shape when viewed from above (see FIG. 6)), which has a circular cross-section orthogonal to the cylinder axis HC of the cylinder wall 24, so that the liquid flow in the primary flow path chamber 39 can be a swirling flow about the cylinder axis HC of the cylinder wall 24. In addition, the liquid can flow into the inside of the screen 10 through the introduction port 36 while this flow is maintained. As described above, since a swirling liquid flow can be formed inside the screen 10, together with the formation of a downward liquid flow inside the screen 10, the liquid can pass through the entire frusto-conical filter element 33 in the vertical direction and the circumferential direction, and the solid foreign matter or the like can be filtered by the entire frusto-conical filter element 33.

The inflow port 6 is provided in the cylinder wall 24 defining the primary flow path chamber 39, and the guide wall 42 that guides liquid in the primary flow path chamber 39 toward the secondary flow path chamber 40 is provided at the internal corner between the cylinder wall 24 facing the inflow port 6 and the top wall 25 continuous with the cylinder wall 24, thereby allowing the liquid to flow smoothly from the primary flow path chamber 39 to the secondary flow path chamber 40. In addition, the liquid tends to stagnate at the internal corner, and solid foreign matter or the like may aggregate and form a lump. However, by providing the guide wall 42 at the internal corner, the liquid can be prevented from stagnating at the internal corner, thereby preventing the formation of a lump with the solid foreign matter or the like aggregated. Note that when the lump with the solid foreign matter or the like aggregated reaches the screen 10, the lump comes into contact with the frusto-conical filter element 33, resulting in the generation of abnormal noise and breakage of the frusto-conical filter element 33.

The cleaning brush 58 that is operated by the handle 62 disposed outside the housing 9 and scrapes off the filter residues adhering to the inner surface of the frusto-conical filter element 33 is provided inside the screen 10, and the drain line 73 formed to extend from the primary side of the screen 10 to the outside of the housing 9 and the drain valve 76 that opens and closes the drain line 73 are provided. Thus, the filter residues adhering to the inner surface of the frusto-conical filter element 33 can be discharged to the outside of the strainer 1 without stopping the piping line. Therefore, the screen 10 can be cleaned without removing the screen 10 from the housing 9.

In the above embodiment, the frusto-conical filter element 33 of the screen 10 is formed in the shape of a tapered cylinder that is tapered downward, but the frusto-conical filter element 33 can be formed in a straight cylindrical shape or a bottom-widening tapered cylindrical shape.

REFERENCE SIGNS LIST

1 In-line strainer
6 Inflow port
7 Outflow port
8 Filter chamber
9 Housing
10 Screen
11 Inflow pipe
12 Outflow pipe
24 Cylinder wall
25 Top wall
26 Bottom wall
33 Filter cylinder
34 Bottom lid
36 Introduction port
38 Through-hole
39 Primary flow path chamber
40 Secondary flow path chamber
42 Guide wall
43 Swirling protrusion
44 Connecting pipe
HC Cylinder axis of housing
IC Cylinder axis of inflow pipe
SC Cylinder axis of screen

The invention claimed is:

1. A filtration device comprising:
a housing (9) including
   a filter chamber (8) extending vertically and formed by a hollow cylindrical wall (24) and a top wall (25) closing an open upper end of the hollow cylindrical wall (24);
   a hollow cylindrical pressing shaft (55) extending into the filter chamber (8) from the top wall (25);
   an inflow port (6) through which liquid to be filtered flows in; and
   an outflow port (7) formed partially on a left rear circumferential surface of the hollow cylindrical wall (24) through which filtered liquid flows out;
an inflow pipe (11) provided on a left side of the housing and in fluid communication with the inflow port (6);
an outflow pipe (12) provided on a right side of the housing and in fluid communication with the outflow port (7);
a hollow frustoconical screen element (10) having a frustoconically shaped screen wall (33) defining a hollow prefilt cavity with an upper open end and a lower open end, disposed in the filter chamber (8) to filter liquid flowing in from the inflow port (6);
a pressing plate (47) having at least one liquid passage hole (54) extending therethrough, dividing the filter chamber (8) into an upper primary flow path chamber (39) in fluid communication with the inflow port (6) and a lower secondary flow path chamber (40) in fluid communication with the outflow port (7);
a through-hole (38) provided between the upper primary flow path chamber (39) and the lower secondary flow path chamber (40), the hollow frustoconical screen element (10) extending through the through-hole (38);
a pressure spring (48) compressively extending between a bottom end face surface (99) of the hollow cylindrical pressing shaft (55) and the pressing plate (47), such that a biasing force is exerted on the pressing plate (47) downwardly to hold the hollow frustoconical screen element (10) in place;
a connecting pipe (44) having a first end in fluid communication with the outflow port (7) and a second end in fluid communication with the outflow pipe (12), the connecting pipe (44) being protrudingly formed on an outer circumferential surface of a rear half of the hollow cylindrical wall (24) and extending obliquely upward while winding around the outer circumferential surface of the hollow cylindrical wall (24); and
a bottom lid (34) closing the lower open end of the hollow frustoconical screen element (10).

2. The filtration device as recited in claim 1, further comprising:
an annular fixing seat (41) peripherally cantilevered inwardly from an inner peripheral surface of the hollow cylinder wall (24), an inner side of the fixing seat (41) defining the through-hole (38).

3. The filtration device as recited in claim 1, further comprising:
a fixing ring (35) is received by the annular fixing seat (41), and disposed beneath the pressing plate (47).

4. The filtration device as recited in claim 1, further comprising:

a cleaning brush (58) rotatably operable by a handle (62) that is disposed above the upper outside of the housing (9); and a handle shaft (63) extending coaxially with an upper end of a brush shaft (59) through an inside of the pressure spring (48), an interior of the cylinder of the pressing shaft (55), a shaft hole (65) extending through the top wall (25), and operably connected to the handle (62).

5. The filtration device as recited in claim 1, wherein the pressure spring (48) is a torsion coil spring.

6. The filtration device as recited in claim 1, wherein:

an extension direction of the cylinder wall (24) is defined as a cylinder axis (HC) and an extension direction of the frustoconically shaped screen wall (33) is defined as a cylinder axis (SC), and both axes (HC, SC) coincide with each other, and a swirling protrusion (43) that slopes downward in a spiral shape is provided on an inner peripheral surface of the cylinder wall (24) that defines the secondary flow path chamber (40).

7. The filtration device as recited in claim 1, further comprising:

a first cylindrical boss (49) extending from a lower surface of the bottom lid (34); and a second cylindrical boss (50) provided on an upper surface of the bottom wall (26) of the cylinder wall (24), the first cylindrical boss (49) being fitted within the second cylindrical boss (50).

8. The filtration device as recited in claim 7, further comprising:

a lower discharge flow path (75) defined by a vertical through-hole that extends from an upper surface of the second boss (50) to a lower surface of a valve boss (77) protruding from a lower surface of a bottom wall (26) of the housing (9).

9. The filtration device as recited in claim 8, further comprising:

a drain valve (76) threadably received within the valve boss (77), including an inner valve body operable by manually turning a lever (78).

10. The filtration device as recited in claim 1, wherein, the pressing plate (47) includes an inner ring (51) that receives the pressure spring (48), an outer ring (52) that engages the fixing ring (35), and a plurality of bridge pieces (53) that are radially provided and interconnect the inner ring (51) and the outer ring (52).

11. The filtration device as recited in claim 10, wherein, the inner ring (51) and the outer ring (52) are concentric ring bodies, and the pressing plate (47) is formed with a plurality of through liquid passage holes (54), which are surrounded by the inner (51) and outer ring (52) and adjacent bridge pieces (53), wherein, liquid in the primary flow path chamber (39) passes through the plurality of liquid passage holes (54) to the hollow interior of the frustoconically shaped screen wall (33) through the introduction port (36).

\* \* \* \* \*